United States Patent [19]
Burch et al.

[11] Patent Number: 5,619,506
[45] Date of Patent: Apr. 8, 1997

[54] METHOD AND APPARATUS FOR REDUCING WAITING TIME JITTER IN PULSE STUFFING SYNCHRONIZED DIGITAL COMMUNICATIONS

[75] Inventors: Richard A. Burch, Madison; Kevin W. Schneider, Huntsville; Michael D. Turner, Madison, all of Ala.

[73] Assignee: Adtran, Inc., Huntsville, Ala.

[21] Appl. No.: 429,950

[22] Filed: Apr. 27, 1995

[51] Int. Cl.[6] .................................................. H04J 3/07
[52] U.S. Cl. .......................... 370/506; 370/516; 375/371
[58] Field of Search ................................ 370/58.1, 58.2, 370/77, 91, 99, 100.1, 102, 105.1, 105.3, 108, 112, 105.2, 105.4, 105.5, 106; 375/371, 372, 373, 375, 342, 363

[56] References Cited

U.S. PATENT DOCUMENTS

| | | | |
|---|---|---|---|
| 4,095,053 | 6/1978 | Duttweiler et al. | 370/102 |
| 4,744,082 | 5/1988 | Fujimura et al. | 370/102 X |
| 4,791,652 | 12/1988 | McEachern et al. | 370/102 |
| 4,811,340 | 3/1989 | McEachern et al. | 370/102 |
| 4,928,275 | 5/1990 | Moore et al. | 370/102 |

*Primary Examiner*—Benedict V. Safourek
*Assistant Examiner*—Ricky Ngo
*Attorney, Agent, or Firm*—Charles E. Wands

[57] ABSTRACT

A jitter/wander reduction mechanism monitors the ratio of pulse stuffing, to detect whenever the pulse stuffing ratio is proximate a prescribed undesirable ratio of stuffs per stuffing opportunity, which causes the wander to be a large number of unit intervals. A stuffing pulse accumulator-controlled frequency shift control circuit monitors the signal produced by a multiplexer (and demultiplexer for full duplex mode) control logic circuit and incrementally adjusts, as necessary, the frequency of a synchronized clock signal input to the multiplexer (and demultiplexer). The magnitude of the incremental frequency shift is sufficient to drive the synchronized clock away from the frequency associated with the undesired stuff ratio to a frequency that is sufficiently separated from the undesired value to produce a stuffing ratio other than the undesired value and reduce the jitter/wander.

20 Claims, 4 Drawing Sheets ically illustrates an example of a
METHOD AND APPARATUS FOR REDUCING WAITING TIME JITTER IN PULSE STUFFING SYNCHRONIZED DIGITAL COMMUNICATIONS

FIELD OF THE INVENTION

The present invention relates in general to digital data communication systems and, more particularly, to a scheme for reducing the amount of waiting time jitter generated by a pulse stuffing synchronization mechanism.

BACKGROUND OF THE INVENTION

Pulse stuffing synchronization is a technique that is used to maintain clock synchronization in digital data communication systems by selectively inserting pulses into a digital data frame. As described in an article by D. L. Duttweiler, entitled: "Waiting Time Jitter," Bell System Technical Journal, January 1972, pp. 165–207, the data clock produced at the output of a pulse-stuffing synchronizer pair contains low frequency jitter, termed waiting time jitter, that cannot be removed. Since this jitter occurs at an arbitrarily low frequency, determined by the relative frequencies of clock signals involved, and is often time varying, it cannot be removed using standard filtering techniques, such as a phase locked loop.

An article by Yoshihisa Matsurra, et al, entitled: "Jitter Characteristics of Pulse Stuffing Synchronization," IEEE ICC Conference Proceedings, June 1968, pp. 259–264, and in an article by Seiichiro Kozuka, entitled: "Phase Controlled Oscillator for Pulse Stuffing Synchronization System," Review of the Electrical Communication Laboratory, Vol. 17, No. 5, May-June 1969, pp. 376–387, describe that when the pulse stuffing ratio is near a fractional ratio having a small denominator, the resulting jitter will be that having the largest amplitude. In particular, when the pulse stuffing ratio is near a ratio of q/p stuffs per stuffing opportunity, the low frequency component of the jitter has an amplitude of 1/p times the size of the stuffing pulse. As an example, if the stuffing ratio is near ½ stuffs per stuffing opportunity, the jitter has a peak-to-peak amplitude of ½ of the size of the stuffing pulse.

Because large amplitude jitter can pose problems in communication systems, limits are placed on the maximum jitter amplitude allowed. Such limits often split the jitter into two types—low and high frequency jitter; the high-frequency jitter is referred to as simply 'jitter', and the low frequency jitter, which has a frequency of less than 10 Hz, is referred to as 'wander'.

One example of digital communication signals for which jitter and wander limits have been defined or standardized in various documents are DS1 (1.544 Mb/s) signals. The ITU-T (CCITT) Recommendation G.824 specifies the maximum allowable jitter for a DS1 signal. ANSI T1,403–1989 limits the maximum peak-to-peak wander and jitter in a 15 minute interval at 5 unit intervals (UI). In addition to these limits, the ANSI T1.101-1993 specification limits the wander of DS1 signals that are used to pass timing information. These limits are in terms of Maximum Time Interval Error (MTIE), and vary from 300 to 1000 ns over observation intervals of 1 to 1000 seconds.

One technique for transporting a DS1 signal over a twisted-pair wireline path is known as the High-bit-rate Digital Subscriber Line (HDSL). HDSL uses pulse-stuffing synchronization to convey the DS1 signal asynchronously to the signal transport mechanism (the synchronized signal), which is timed via a HDSL master oscillator. The stuffing pulses used in HDSL are approximately 5100 ns long, which is nearly 8 UI of the DS1 signal. The nominal stuffing ratio for HDSL is ½, so that the wander may be as large as 4 UI, which is approximately 2550 ns.

FIG. 1 diagrammatically illustrates an example of a sync-multiplexer arrangement for HDSL applications based upon the signal processing mechanism described in the above-referenced Duttweiler article. As shown therein, an unsynchronized data signal is coupled over an input link 11 to both a timing extractor 13 and an elastic store (buffer) 15. Timing extractor 13 is operative to generate a frame sync signal on line 17, when the data signal is framed and it is desired to keep a prescribed phase relationship between the framing of the data signal and the stuffing frame of an output data signal on a downstream output link 19. If a frame sync signal on line 17 is used, elastic store 15 is a frame aligned elastic store. The timing extractor 13 also extracts a write clock signal on write clock line 18. The write clock signal on write clock line 18 is employed to write the data signal on link 11 into elastic store 15, and is also applied as first input 21 of a phase comparator 23.

A synchronized data signal on data output line 25 from elastic store 15 is read out using a read clock supplied over read clock line 27 from an output multiplexer 30. The read clock is also applied to a second input 22 of phase comparator 23. Phase comparator 23 provides a binary output signal on line 31 to a control (combinational and sequential) logic circuit 33. Control logic circuit 33 responds to the logical states of its various inputs and supplies a control signal over line 39 to multiplexer 30.

In response to the control signal on line 39, multiplexer 30 is operative to switch output line 19 to one of the synchronized data signal on line 25, an 'other' data signal on line 41, and a stuffing pulse data signal on line 43. Multiplexer 30 also switches the synchronized clock signal on line 35 to respective read clock lines 27, 42 and 44, in order to read the selected data signal. The 'other' data signal on line 41 is derived from associated memory 40, which is customarily employed to store synchronization, maintenance, monitoring, and other various data that is incorporated into the output synchronized data signal. The stuffing pulse signal on line 43 is derived from associated memory 45 that stores the values of the stuffing pulses. Control logic circuit 33 directs multiplexer 30 to switch between the synchronized data signal on line 25 and the 'other' data signal on line 41, in accordance with a predefined stuffing frame format. The predefined stuffing frame has an opportunity to have a predetermined number of stuffing pulses inserted every stuffing frame, based on the sampled value of the phase comparator output on line 31.

SUMMARY OF THE INVENTION

In accordance with the present invention, the ratio of pulse stuffing is monitored to detect whenever the pulse stuffing ratio is proximate a prescribed ratio of stuffs per stuffing opportunity, which might cause the wander to be a large number of UIs (e.g. 4 UI in the case of a ratio of ½). In response to detecting such a stuffing ratio, the frequency of the synchronized clock signal is changed in a direction so as to cause the stuffing ratio to depart from the undesirable number of stuffs per stuffing opportunity to a more acceptable value.

The jitter wander reduction mechanism employs a frequency shift control circuit that monitors the signal produced by the multiplexer control logic circuit and adjusts, as necessary, the frequency of the synchronized clock signal input to the multiplexer. The frequency shift control circuit includes a stuffing pulse accumulator which counts the control signals as they are produced by the multiplexer control logic circuit. The count value of the accumulator is coupled to a frequency shift control logic circuit, which compares the running count total within the stuffing pulse accumulator with one or more prescribed count thresholds.

At the end of a prescribed period, the accumulated count value is reset. Subsequently, during the next count interval, if the running total stuffing pulse accumulator falls within a prescribed bounded region associated with an undesirable stuffing ratio, the logic state output of the shift control logic circuit will change state. This change in state of the output of the shift control logic circuit will cause an associated frequency shifter to change the frequency supplied from a sync clock generator by a prescribed amount $+/-\delta f$. The magnitude of this incremental frequency shift $\delta$ is sufficient to drive the synchronized clock away from the frequency associated with the undesired stuff ratio (q/p) to a frequency that is sufficiently separated from the undesired value to produce a stuffing ratio other than the undesired q/p value and reduce the jitter wander.

The rate of change in the frequency of the synchronized clock signal must be sufficiently slow, so that it does not cause problems for various signal transmission components. As long as the accumulated count value within the stuffing pulse accumulator falls outside the 'undesired' region, then it is inferred that the sync clock frequency is at a value that will ensure that the stuffing ratio is sufficiently separated from undesired ratio. Incremental frequency changes provided by the frequency shifter change the sync clock frequency up and down (to higher and lower frequencies) about a nominal frequency. In this manner the frequency shifter is operative to incrementally shift the frequency in a direction that will take it outside the undesired region.

For a full-duplex mode transceiver, a demultiplexer-desynchronizer is coupled to receive an incoming synchronized data signal, which is applied to a timing/sync extractor and a demultiplexer. The timing/sync extractor derives a synchronized clock signal and supplies the sync clock to a control logic unit and to the demultiplexer 75. It also provides a stuffing frame sync (synchronization) signal to the control logic unit.

Similar to the control logic unit in the multiplexer-synchronizer, the control logic unit employs the synchronized clock to provide a control signal to the demultiplexer. The control logic unit is coupled to an associated stuffing pulse accumulator, similar to the stuffing pulse accumulator of the synchronizer-multiplexer. The output of this associated stuffing pulse accumulator is coupled to the frequency shift control logic circuit of the synchronizer-multiplexer, so that the frequency shift control logic circuit is operative to controllably adjust the frequency output of the frequency shifter in response to the contents of either of the stuffing pulse accumulators falling within the undesired region.

The control logic circuit within the demultiplexer-desynchronizer also controls the demultiplexer to switch incoming data and clock signals between one of three possible outputs: synchronized data and its associated write clock, other data signal and its associated write clock, and a stuffing pulses data signal and its associated write clock. A desynchronized signal is read out of an elastic store using a read clock. Write an read clock signals are supplied to a phase comparator, which supplies a phase error signal to a voltage controlled oscillator. The oscillator generates the read clock having a frequency which varies with the amplitude of the phase error signal.

DETAILED DESCRIPTION

Figure 1:
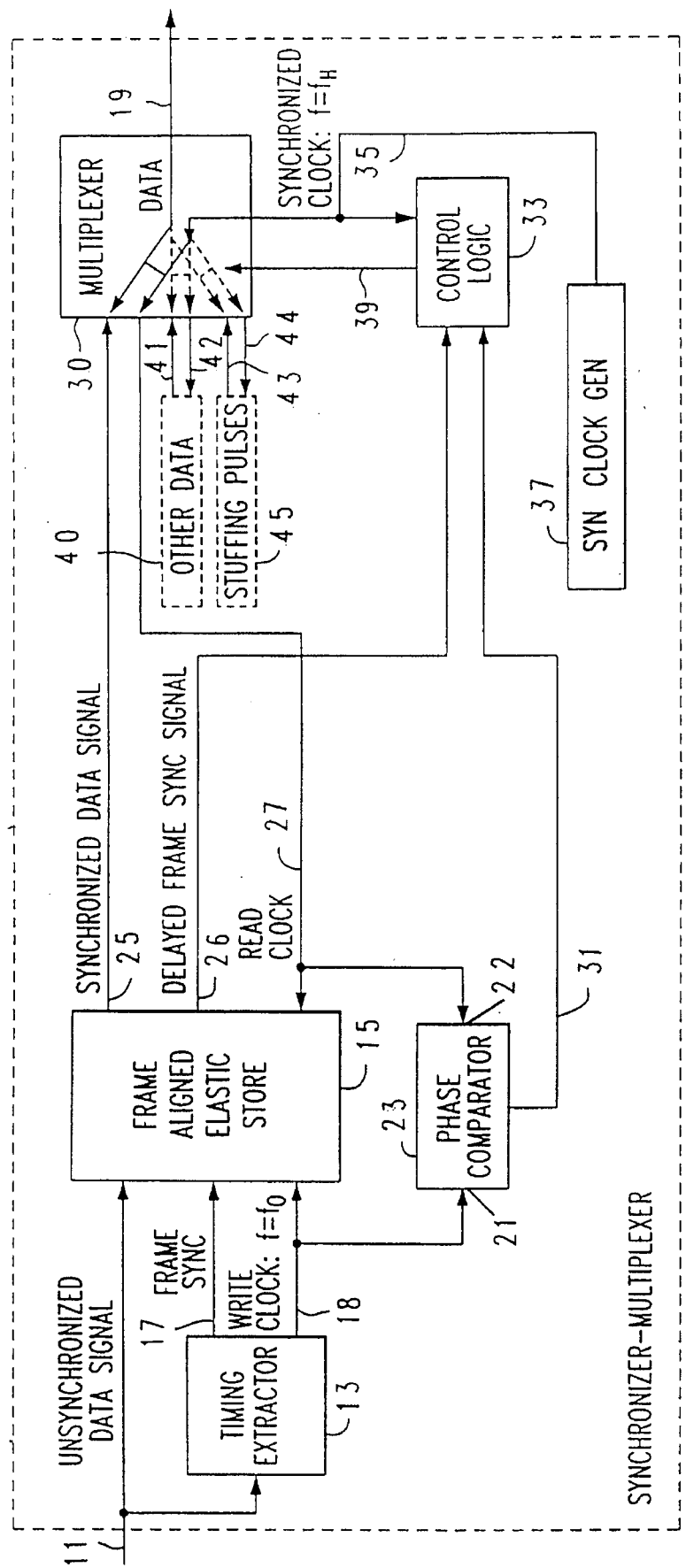
FIG. 1 diagrammatically illustrates an example of a prior art jitter wander reduction mechanism that has been proposed for incorporation into the synchronizer-multiplexer portion of an HDSL system utilizing pulse-stuffing synchronization.

Before describing in detail the new and improved waiting time jitter wander reduction mechanism in accordance with the present invention, it should be observed that the present invention resides primarily in what is effectively a prescribed digital signal processing technique that may be implemented by means of conventional digital communication and signal processing circuit components. Consequently, the manner in which such circuit components are interfaced with one another has been illustrated in the drawings in readily understandable block diagram format, which show only those specific details that are pertinent to the present invention, so as not to obscure the disclosure with details which will be readily apparent to those skilled in the art having benefit of the description herein. Thus, the block diagram illustrations are primarily intended to illustrate the major components of the system in a convenient functional grouping, whereby the present invention may be more readily understood.

As pointed out briefly above, in accordance with the present invention, the ratio of pulse stuffing is monitored to detect whenever the pulse stuffing ratio is proximate a prescribed ratio q/p (e.g. ½) stuffs per stuffing opportunity, which might cause the wander to be a large number of UIs (e.g. 4 UI in the case of a ratio of ½) and, in response to detecting such a stuffing ratio, to change or switch the frequency of the synchronized clock signal to cause the stuffing ratio to depart from the undesirable q/p stuffs per stuffing opportunity to a more acceptable value. For this purpose, the jitter wander reduction mechanism of FIG. 1 is modified in the manner shown in FIG. 2, to incorporate a frequency shift control circuit 50, that monitors the signal produced by control logic circuit 33, and adjusts, as necessary, the frequency of the synchronized clock signal on sync clock line 35 to the multiplexer 20.

Figure 2:
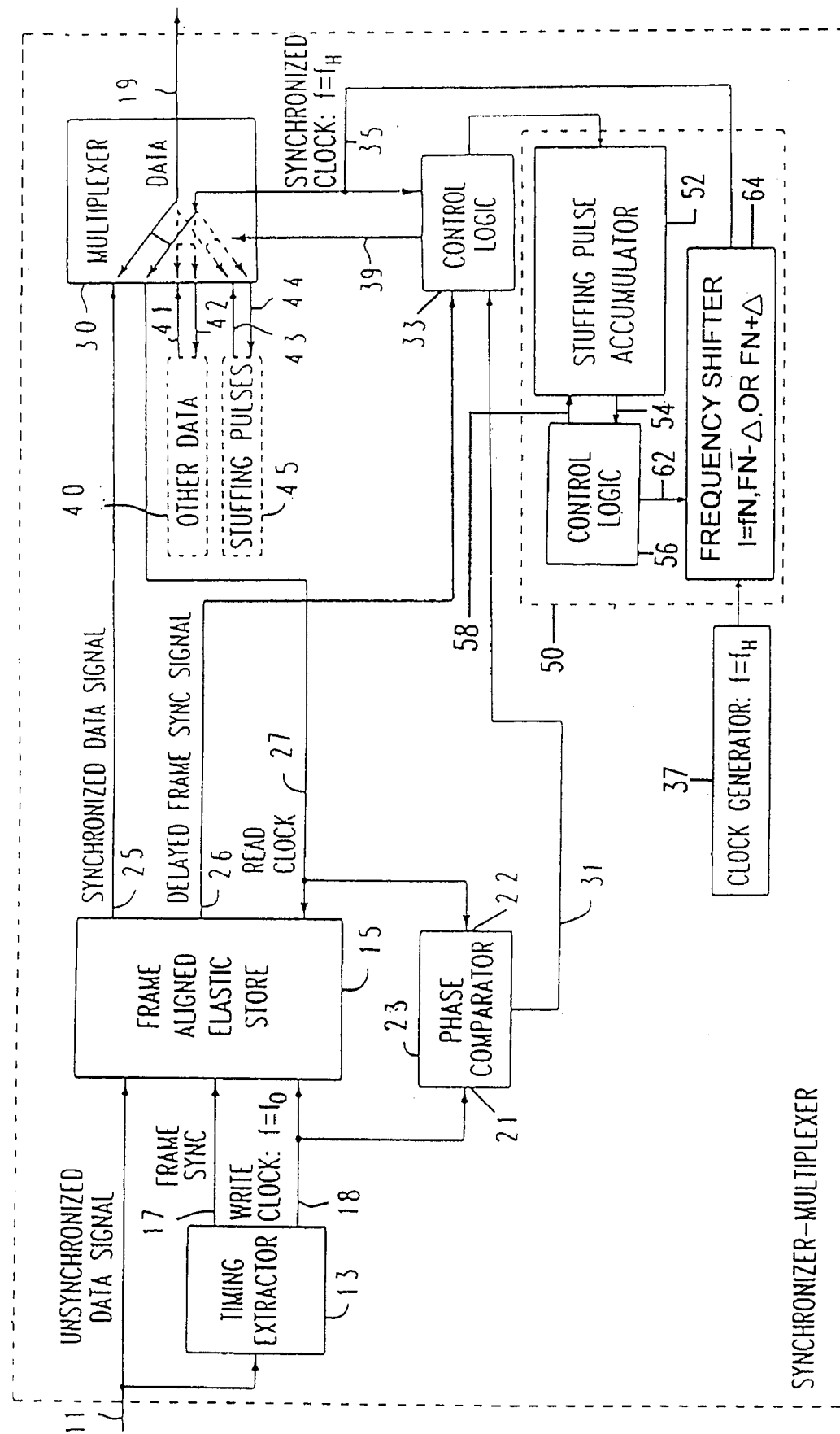
FIG. 2 diagrammatically illustrates a jitter wander reduction mechanism to be incorporated into the synchronizer—multiplexer portion of an HDSL system utilizing pulse-stuffing synchronization in accordance with the present invention.

More particularly, as shown in FIG. 2, frequency shift control circuit 50 includes a (stuffing pulse) accumulator 52 to which stuffing pulse contents of the control logic output signal on line 39 from control logic circuit 33 is applied. Stuffing pulse accumulator 52 is operative to count stuffing pulse control signals as they are produced by control logic circuit 33 over a prescribed stuffing pulse monitor interval. The count value is coupled over line 54 to a control logic circuit 56, which compares the running count total within stuffing pulse accumulator 52 with a prescribed count threshold.

In addition, via internal timing logic, control logic circuit 56 supplies a reset signal over line 58 to stuffing pulse accumulator 52. This reset signal serves to periodically clear (or reset to zero) the contents of the accumulator 52. The output of control logic circuit 56 is coupled over line 62 to a frequency shifter 64. Frequency shifter 64 may comprise a numerically controlled oscillator NCO or equivalent circuit (e.g. voltage controlled oscillator), with the code or voltage input employed to switch between frequencies.

Frequency shifter 64 controllably shifts the synchronized clock output $f_H$ of a clock generator 37 in accordance with a prescribed frequency shift state diagram, to be described, in response to the logic level on output line 62 from control logic circuit 56. The rate of the frequency shift of the synchronized clock signal must be sufficiently slow, so that it does not cause problems for various signal transmission components (such as equalizers, timing loops, etc., not shown) that are part of a digital transmission system (such as an HDSL system). The controllably adjusted or shifted sync clock signal is output by frequency shifter 64 over line 35.

Figure 3:
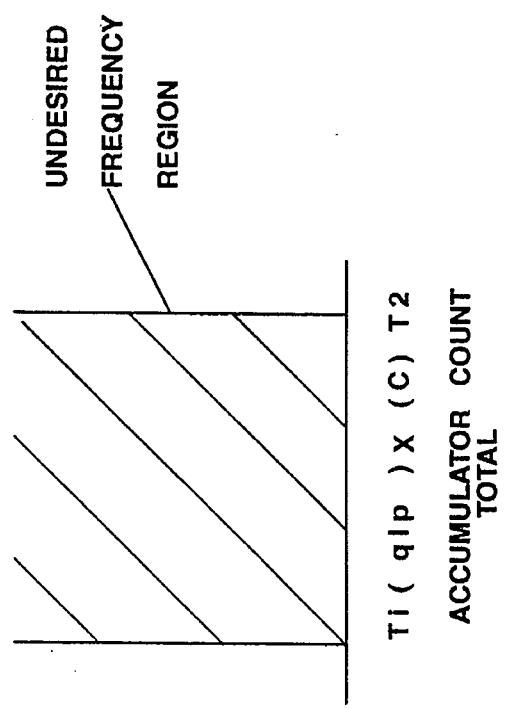
FIG. 3 shows a prescribed bounded region associated with an undesirable stuffing ratio.

In operation, at the end of a prescribed period or whenever a frequency shift is performed, the accumulated count value within stuffing pulse accumulator 52 is reset by a signal on link 58. During a subsequent stuffing pulse count period (having C stuff pulse opportunities within the period), should the accumulated count value within stuffing pulse accumulator 52 reach a value that falls within a prescribed bounded region 60 shown in FIG. 3 as being centered about a count of (q/p)x(C), associated with an undesirable stuffing ratio (q/p stuffs per stuffing opportunity, where p is a small integer, and the wander produced has an amplitude of l/p), the logic state output of the shift control logic circuit 56 will change state, and cause frequency shifter 64 to shift the frequency supplied from sync clock generator 37 by a prescribed amount +/–δf. This incremental frequency shift will drive the synchronized clock output on link 35 away from the frequency associated that is associated with the undesired stuff ratio (q/p), to a new frequency that is sufficiently separated from the undesired value to produce a stuffing ratio other than the undesired q/p value and reduce the jitter wander.

More particularly, as long as the accumulated count value within the stuffing pulse accumulator 52 is outside the 'undesired' region 60, the sync clock frequency signal on line 35 is presumed to be at a value that will ensure that the stuffing ratio is sufficiently separated from undesired ratio. When the accumulated count value within stuffing pulse accumulator 52 is found within the undesired region 60, the logic state on control logic output line 62 of control logic circuit 56 changes to a value that will drive the frequency shifter 64 to a different state, in accordance with a prescribed incremental frequency change state diagram.

Figure 4:
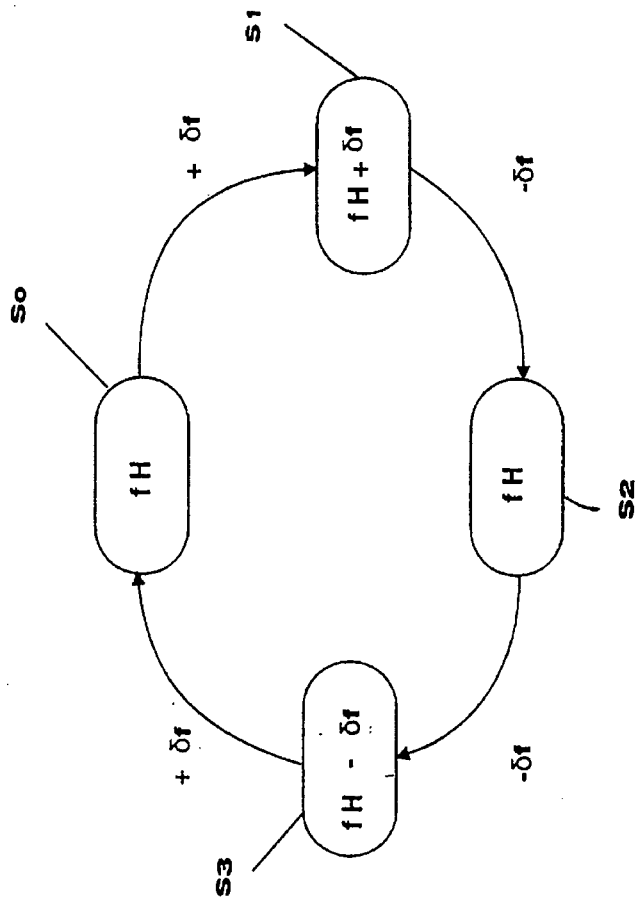
FIG. 4 shows a state diagram associated with the operation of the controlled frequency shifter 64 of FIG. 2.

According to this state diagram, shown in FIG. 4, letting the initial value of state S0 be a nominal frequency f0=$f_H$, then, in response to a control signal on line 62, frequency shifter 64 transitions from state S0 to state S1, wherein it increments its output frequency to a new high frequency corresponding to $f_H$+δf. Once the accumulated count value within accumulator 52 has exceeded the threshold, and falls outside the bounded region 60, indicating that the sync clock frequency is now at a value that will ensure that the stuffing ratio is sufficiently separated from undesired ratio, the logic value on control logic output line 62 changes, frequency shifter 64 remains in the same state, and the output frequency on line 35 remains at the same value until receipt of another change request signal on line 62. Control logic circuit 56 continues to monitor the contents of stuffing pulse accumulator 52. When the accumulated count value of accumulator 52 once again drops below the threshold, the value on line 62 once again becomes a prescribed logic level (e.g. 1 corresponding to a frequency change request).

This process is continuously repeated, so as to cause the frequency of the synchronized clock signal to be changed and thereby provide a frequency shift that progressively changes, yet does so in a manner that avoids a stuffing ratio associated with a large amplitude valued wander.

According to the state diagram of FIG. 4, the next shift (state transition to state S2) bumps or transitions the frequency to a value in the opposite direction from $f_H$+δf back to $f_H$. A further state transition to state S3 causes a decrease in the frequency from $f_H$ to $f_H$–δf. Finally, the next transition (from state S3 to state S0) brings the frequency output from a value of $f_0$–δf back once again to $f_H$, and so on. In this manner, frequency shifter 64 is operative to incrementally shift its output frequency on line 35 in a direction that will take it outside the undesired region 60.

Figure 5:
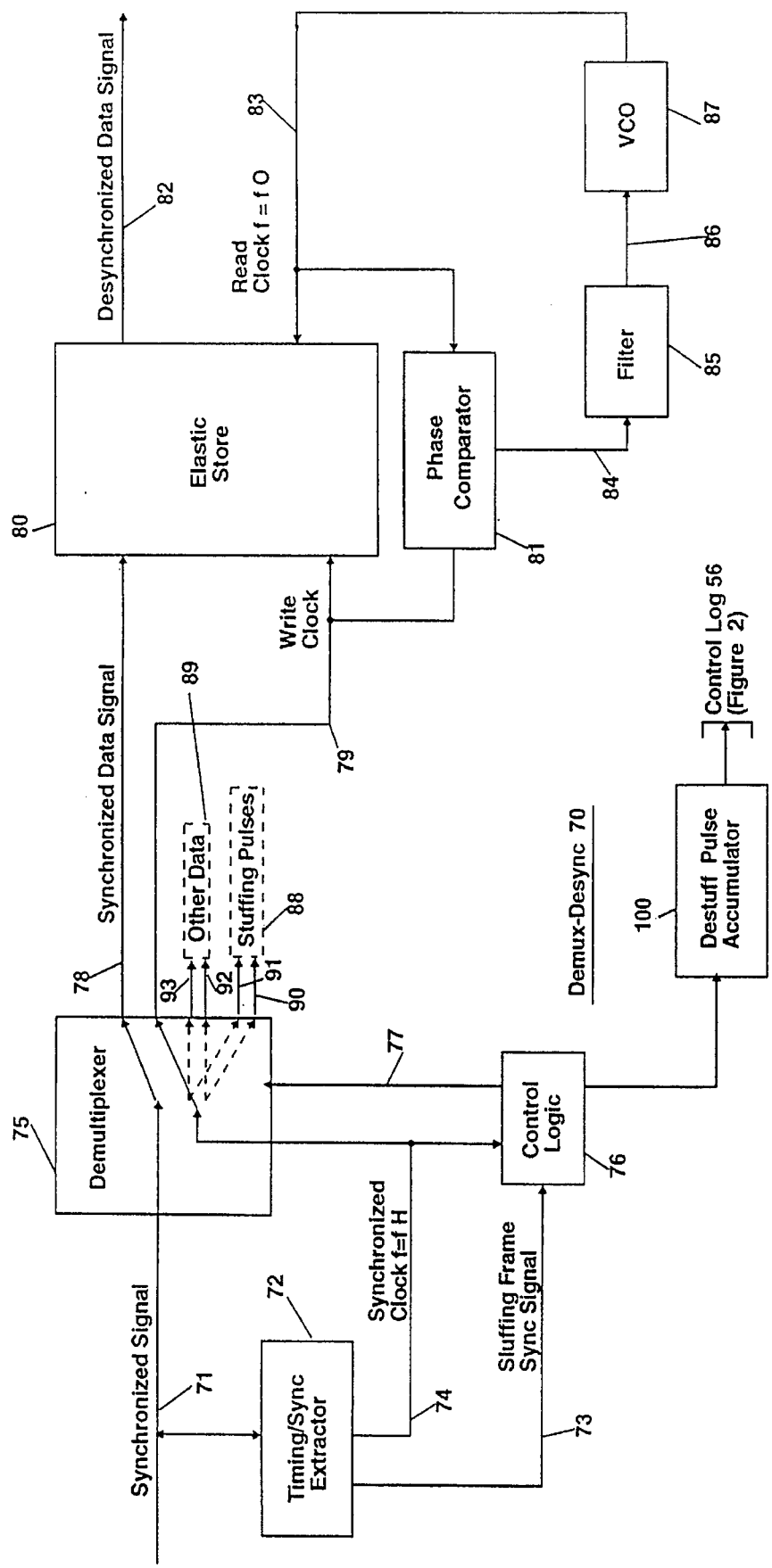
FIG. 5 diagrammatically illustrates the configuration of a demultiplexer-desynchronizer.

FIG. 5 diagrammatically illustrates a respective demultiplexer-desynchronizer 70 employed in a full-duplex transceiver, wherein an incoming synchronized data signal on line 71 (corresponding to the signal on line 25 in FIG. 2) is input to a timing/sync extractor 72 and a demultiplexer 75. The timing/sync extractor 72 derives a synchronized clock signal and supplies the sync clock over link 74 to a control logic unit 76 and to demultiplexer 75. It also provides a stuffing frame sync (synchronization) signal on line 73 to control logic unit 76.

Similar to the control logic unit in the multiplexer-synchronizer of FIG. 2, described above, control logic unit 76 employs the synchronized clock 74 to provide a control signal on link 77 to demultiplexer 75. The stuffing pulse contents of the control logic unit 76 is also coupled to an associated stuffing pulse accumulator 100, similar to stuffing pulse accumulator 52 of the synchronizer-multiplexer of FIG. 2, described above. The output of stuffing pulse accumulator 100 is coupled to control logic circuit 56 in FIG. 2. In addition, stuffing pulse accumulator 100 is coupled to reset line 58 from control logic circuit 56.

Thus, for a full-duplex mode transceiver configuration, control logic circuit 56 is operative to controllably adjust the frequency output of frequency shifter 64 in response to the contents of either stuffing pulse accumulator 52 or stuffing pulse accumulator 100 falling within the region 60. For full duplex operation, wherein the input asynchronous signals in opposite transport directions are asynchronous with respect to each other, as well as to the synchronized signals, and where the synchronized signals in each direction are synchronous to each other, a minimum of three frequency choices, described above, is required for a single undesired region 60. For the general case, N frequency choices may be used.

For the case of avoiding a single stuffing ratio, the frequency change of the synchronized signal can be accomplished by switching among the frequency choices $f_H$, f=$f_H$–δf, and f=$f_H$+δf, as described above, where δf is sufficient to change the stuffing ratio to an acceptable value that is not proximate to the ratio that cause a large amplitude wander value.

Control logic circuit 76 also produces a demultiplexer control signal on line 77, which directs demultiplexer 75 to switch the incoming data on line 71 and the clock signal on line 74 between one of three possible outputs: (1) the synchronized data signal 78 and its associated write clock 79, (2) other data signal 93 and its associated write clock 92, and (3) the stuffing pulses data signal 91 and its associated write clock 90. The synchronized data signal 78 is written into an elastic store 80 using write clock 79.

Conversely, a desynchronized signal 82 is read out of elastic store 80 using a read clock 83. The write clock 79 and read clock 83 are supplied to a phase comparator 81, which outputs a phase error signal on line 84. The phase error signal 94 is filtered by a filter 85 and the resulting filtered error signal 86 is coupled as an input to a voltage controlled oscillator (VCO) 87. VCO 87 generates read clock 83, the frequency of which varies with the (voltage) amplitude of the filtered error signal 86.

In addition to filtering out gaps in the write clock 79 due to the presence of stuffing pulses 88, the filter 95 is also operative to filter out gaps in the write clock 79 due to the presence of other data 89 in the predetermined stuffing frame format.

As will be appreciated from the foregoing description, the jitter wander reduction mechanism of the present invention is operative to monitor the ratio of pulse stuffing, so as to detect whenever the pulse stuffing ratio is proximate a prescribed undesirable ratio of stuffs per stuffing opportunity, which causes the wander to be a large number of unit intervals. The mechanism employs a stuffing pulse accumulator-controlled frequency shift control circuit that monitors the signal produced by the multiplexer (and demultiplexer for full duplex mode) control logic circuit and incrementally adjusts, as necessary, the frequency of a synchronized clock signal input to the multiplexer (demultiplexer). The magnitude of the incremental frequency shift is sufficient to drive the synchronized clock away from the frequency associated with the undesired stuff ratio (q/p) to a frequency that is sufficiently separated from the undesired value to produce a stuffing ratio other than the undesired q/p value and reduce the jitter wander.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of synchronizing an asynchronous signal to produce a synchronized signal comprising the steps of:

(a) performing a comparison of phases of the asynchronous signal and the synchronized signal to produce a stuff control signal and controllably stuffing the asynchronous signal with pulses at a ratio of stuffs per stuffing opportunity in dependence upon said stuff control signal; and (b) controllably adjusting the frequency of said synchronized signal in accordance with said ratio of stuffs per stuffing opportunity.

2. A method according to claim 1, wherein step (b) comprises controllably changing the frequency of said synchronized signal to a value that is not proximate a stuffing ratio associated with a given undesired stuffing ratio of q stuffs per stuffing opportunity p, wherein each of q and p is a small integer.

3. A method according to claim 1, wherein step (b) comprises monitoring the number of stuffs controllably stuffed in step (a) over a prescribed interval, and incrementally changing the frequency of said synchronized signal in response to said number of stuffs having a prescribed relationship with respect to a criterion.

4. A method according to claim 3, wherein step (b) comprises incrementally increasing the frequency of said synchronized signal.

5. A method according to claim 3, wherein step (b) comprises incrementally decreasing the frequency of said synchronized signal.

6. An apparatus for synchronizing an asynchronous digital signal to produce a synchronized digital signal comprising:

an elastic store into which successive components of said asynchronous digital signal are written by a write clock coupled to said elastic store, and from which successive components of said synchronized digital signal are read out by a read clock coupled to said elastic store;

a phase comparator to which said write and read clocks are coupled and which is operative to produce an output representative of the phase difference between said write and read clocks;

an output multiplexer which is coupled to receive said synchronized digital signal and stuff pulses, and is operative to controllably multiplex said stuff pulses with components of said synchronized signal in accordance with a control signal to produce a stuffed synchronous output signal having a number of stuffs per stuffing opportunity; and a stuff controller which is operative to generate said control signal in accordance with the output of said phase comparator, said stuff controller controllably adjusting the frequency of said synchronized signal in accordance with said ratio of stuffs per stuffing opportunity.

7. An apparatus according to claim 6, wherein said stuff controller is operative to controllably change the frequency of said synchronized signal to a value that is not proximate to a stuffing ratio associated with a given undesired stuffing ratio of q stuffs per stuffing opportunity p, wherein each of q and p is a small integer.

8. An apparatus according to claim 7, wherein said stuff controller is operative to monitor the number of stuffs controllably multiplexed by said multiplexer over a prescribed interval, and incrementally changes the frequency of said synchronized signal in response to said number of stuffs having a prescribed relationship with respect to a criterion.

9. An apparatus according to claim 8, wherein said stuff controller is operative to incrementally increase the frequency of said synchronized signal.

10. An apparatus according to claim 8, wherein said stuff controller is operative to incrementally decrease the frequency of said synchronized signal.

11. An apparatus according to claim 6, wherein said stuff controller comprises a stuffing pulse accumulator, which is operative to monitor the number of stuffs carried out over a given interval, and a controllable synchronized clock generator, the output frequency of which is incrementally changed so as to adjust the frequency of said synchronized signal, in response to said number of stuffs accumulated by said stuffing pulse accumulator at any time during said given interval having a prescribed relationship with respect to a criterion.

12. An apparatus according to claim 11, wherein said stuff controller is operative to incrementally increase the frequency of said synchronized signal.

13. An apparatus according to claim 11, wherein said stuff controller is operative to incrementally decrease the frequency of said synchronized signal.

14. An apparatus according to claim 6, further including a demultiplexer-desynchronizer for desynchronizing a synchronized digital signal to produce a desynchronized digital signal, said demultiplexer-desynchronizer including:
- an input demultiplexer which is coupled to receive said synchronized digital signal and is operative to controllably demultiplex said synchronized signal to a selected output line including a stuff pulses output line in accordance with a destuff control signal to produce a destuffed synchronized digital signal;
- a further elastic store into which successive components of said destuffed synchronized digital signal are written by a write clock therefor, and from which successive components of a desynchronized digital signal are read out by a read clock therefor;
- a further phase comparator to which said write and read clocks are coupled and which is operative to produce an output representative of the phase difference between said write and read clocks;
- a read clock generator which is operative to generate said read clock in accordance with said output representative of the phase difference between said write and read clocks; and
- a destuff controller which is operative to generate said destuff control signal, said destuff controller being coupled to further controllably adjust the frequency of said synchronized signal to a value that is not proximate said stuffing ratio associated with said given undesired stuffing ratio of q stuffs per stuffing opportunity p.

15. An apparatus according to claim 14, wherein said destuff controller is operative to monitor the number of destuffs carried out over a prescribed interval, and incrementally causes the frequency of said synchronized signal to be changed in response to said number of destuffs having said prescribed relationship with respect to said criterion.

16. An apparatus according to claim 15, wherein said destuff controller is operative to cause the frequency of said synchronized signal to be incrementally increased.

17. An apparatus according to claim 15, wherein said stuff controller is operative to cause the frequency of said synchronized signal to be incrementally decreased.

18. An apparatus according to claim 14, wherein said destuff controller comprises a destuffing pulse accumulator, which is operative to monitor the number of destuffs carried out over a given interval, and wherein the output frequency of said controllable synchronized clock generator is incrementally changed so as to adjust the frequency of said synchronized signal, in response to said number of destuffs accumulated by said destuffing pulse accumulator at any time during said given interval having a prescribed relationship with respect to a criterion.

19. An apparatus according to claim 18, wherein said destuff controller is operative to cause the frequency of said synchronized signal to be incrementally increased.

20. An apparatus according to claim 18, wherein said destuff controller is operative to cause the frequency of said synchronized signal to be incrementally decreased.

* * * * *